(12) United States Patent
White

(10) Patent No.: US 7,735,792 B1
(45) Date of Patent: Jun. 15, 2010

(54) REVERSIBLE MOUNTING BRACKET FOR OPEN OFFICE IDENTIFICATION

(76) Inventor: Stuart M. White, 1421 W. Lewis St., San Diego, CA (US) 92103

( * ) Notice: Subject to any disclaimer, the term of this patent is extended or adjusted under 35 U.S.C. 154(b) by 0 days.

(21) Appl. No.: 12/218,963

(22) Filed: Jul. 21, 2008

(51) Int. Cl.
*E04G 5/06* (2006.01)
(52) U.S. Cl. .................. 248/220.43; 52/38; 248/222.14
(58) Field of Classification Search ............ 248/220.43, 248/221.11, 222.14, 220.41, 243, 244, 246; 52/38; 40/606.14
See application file for complete search history.

(56) References Cited

U.S. PATENT DOCUMENTS

| | | | | |
|---|---|---|---|---|
| 3,614,045 A | * | 10/1971 | Cegielski, Jr. ............... | 248/262 |
| 4,027,453 A | * | 6/1977 | Bridge ........................ | 403/353 |
| 4,453,641 A | * | 6/1984 | Rasmussen et al. ......... | 211/151 |
| 4,515,494 A | * | 5/1985 | Robilliard et al. ........... | 403/187 |
| 4,531,698 A | * | 7/1985 | Sharber ...................... | 248/243 |
| 4,535,704 A | * | 8/1985 | Suttles ....................... | 108/108 |
| 4,805,861 A | * | 2/1989 | Thalenfeld et al. ....... | 248/221.11 |
| 5,984,118 A | * | 11/1999 | Morrow ..................... | 211/59.1 |
| 2004/0159755 A1 | * | 8/2004 | Valiulis et al. ......... | 248/220.43 |
| 2008/0149576 A1 | * | 6/2008 | Onachilla et al. .......... | 211/85.5 |

* cited by examiner

*Primary Examiner*—Ramon O Ramirez
(74) *Attorney, Agent, or Firm*—Allan M. Shapiro

(57) ABSTRACT

The mounting bracket has a flange which reaches in between portions of the open office structure and releasably engages in the slots in the post of the open office structure. The releasable engagement comprises tee-shaped hooks, configured so that they engage reversibly in the slots in either of the posts on the left or right side of the office entryway opening. A web on the flange carries an identification plate.

11 Claims, 3 Drawing Sheets

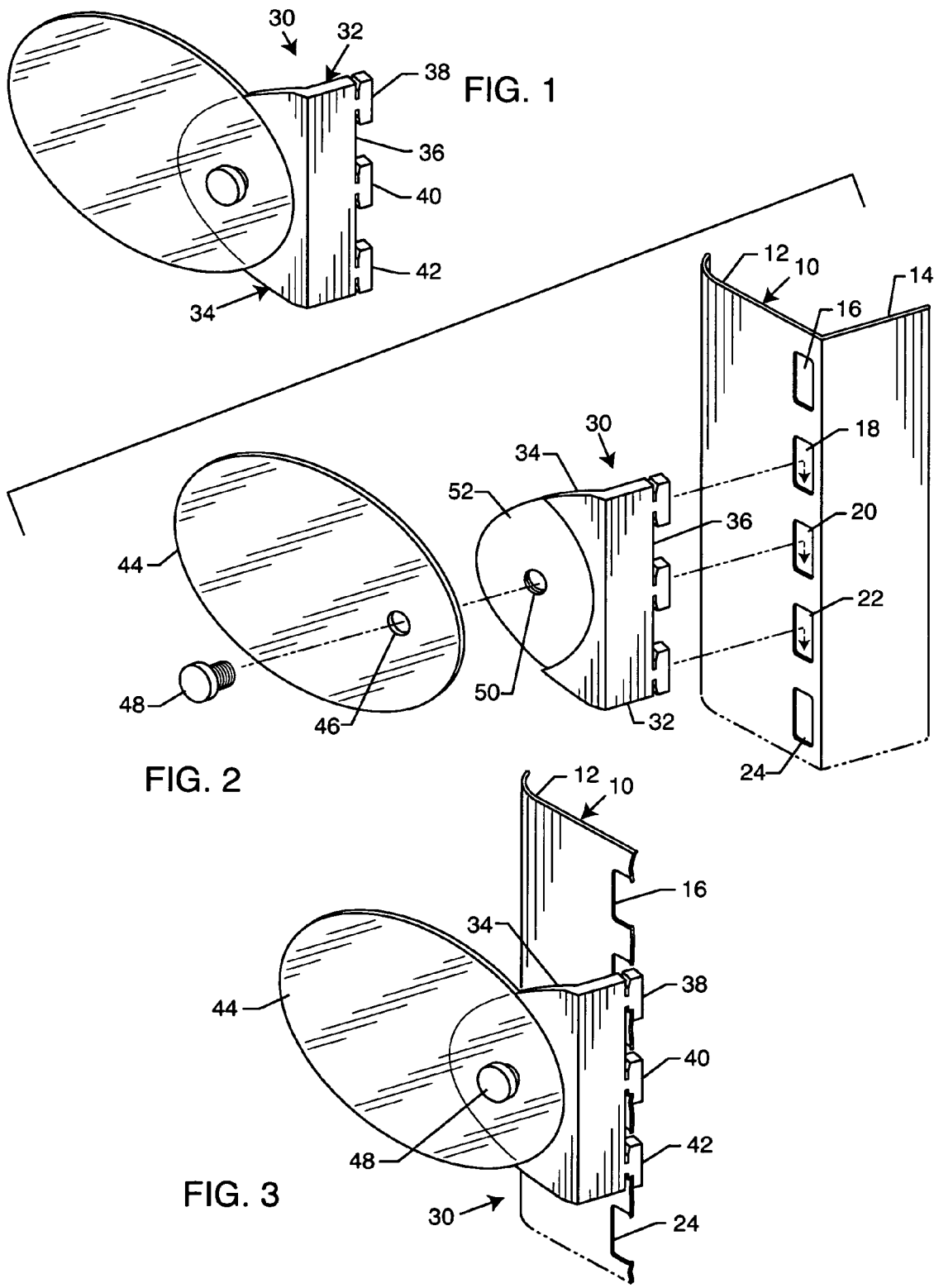

REVERSIBLE MOUNTING BRACKET FOR OPEN OFFICE IDENTIFICATION

BACKGROUND

In modern office spaces, privacy is provided to each occupant in the open office structure by providing low walls to divide office spaces. These walls are formed of commercially available sections. Posts are mounted on the floor and they extend upward. Panels usually are provided with pressure clips which attach to the posts along the post edges to create an attached structure. Suitable posts and panels create the individual spaces of the open office. It is helpful and necessary to mark individual open office spaces. Such identification is common and is usually applied by adhesive or penetrating fasteners to the wall panels. Such attachment of identification devices unavoidably marks the panels and prevents clean removal and replacement of identification devices when changes are needed or desired. There is need for an identification mounting apparatus which can be attached to the open office structure on the left or right side of the office entryway opening in such a way that it is reversible, detachable, and does not deteriorate the panel.

SUMMARY OF THE INVENTION

In order to aid in the understanding of this invention, it can be stated in essentially summary form that it is directed to a reversible mounting bracket for open office identification. The bracket includes a web which is sized to reach around the edge of a panel. The posts have upright slots therein. The web has hooks thereon for engaging in slots in the upright posts in either left or right orientation with respect to the entryway. The bracket has structure thereon for mounting an identification plate.

It is thus the purpose and advantage of this invention to provide a reversible mounting bracket for open office identification, wherein the bracket has a web which reaches past the panel and into the upright post to engage the slots in the upright post for releasable mounting.

Another purpose and advantage of this invention is to provide a reversible structure wherein the bracket can be inserted in at least two different orientations of left or right side of the office entryway opening and reach in past the panel to engage into an upright post in an open office structure so that the identification mounting bracket can be installed in alternate positions.

It is another purpose and advantage of this invention to provide a reversible mounting bracket for open office identification wherein the bracket is economic so it can be widely used and easy to install and remove so that it can be positioned and reused as desired.

Another purpose and advantage of this invention is to provide a mounting bracket which is configured to accept different sizes and styles of identification plates so that the same bracket can be used with plates of different colors and/or shapes, for further identification.

The features of this invention which are believed to be novel are set forth with particularity in the following description and the appended claims. The present invention, both as to its organization and manner of operation, together with further objects and advantages thereof, may be understood best by reference to the following description, taken in conjunction with the following drawings.

BRIEF DESCRIPTION OF THE DRAWINGS

FIG. 1 is an isometric view of the reversible mounting bracket for open office identification in accordance with this invention.

FIG. 2 is a similar view with the identification panel exploded from the bracket and the bracket exploded from the upright post.

FIG. 3 is a view similar to FIG. 2, in the assembled position, but with part of the upright post broken away to show the inter-engagement with the upright post.

DESCRIPTION OF THE PREFERRED EMBODIMENTS

Figure 5:
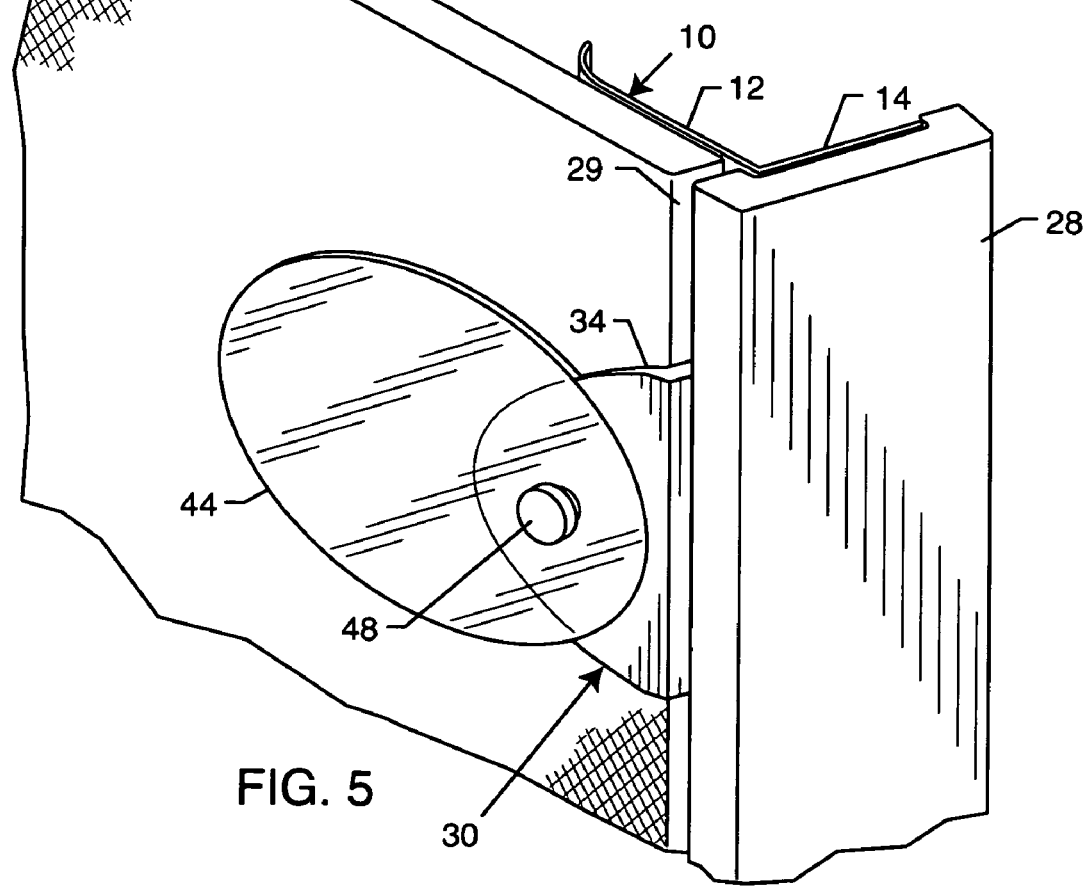
FIG. 5 is a similar view but showing the open office panel and finish strip mounted on the post with the reversible mounting bracket in place.

Open office systems are created by using upright posts upon which are mounted modular panels to divide off individual office spaces. The upright posts can be square tubes, channels, or angles. In the present illustrated case, the post is shown as an upright angle bar 10 having two flanges 12 and 14 at right angles to each other. The flange 12 has a plurality of upright oriented inline rectangular slots. Slots 16, 18, 20, 22, and 24 are identified in FIG. 2. To enclose an open office space with this system, panel 26 (see FIG. 5) is engaged onto the post 10. The panel 26 may have pressure clips (not shown) to attach to the post at, for example, flange 12. To create an entryway opening to provide access into one of the open office spaces, trim strip 28 can be attached to the flange 14. This is purely for decorative purposes and to protect the occupant against the possible sharp edges of the post. The configuration is such that, with either a trim strip 28 or a similar panel 26 continuing along to define an elongated wall, sufficient space (see FIG. 5) is provided between these structural elements to permit access to the longitudinally aligned slots on the post. The present reversible mounting bracket of this invention takes advantage of this access.

The reversible mounting bracket of this invention is generally indicated at 30 in FIGS. 1, 2, 3, 4, 5, 6, and 7. As seen in FIGS. 1, 2 and 3, the mounting bracket 30 has a flange 32 and a web 34. The flange and web are substantially planar structures of substantially uniform thickness and are formed at substantially a right angle with respect to each other. The flange 32 has a rearward face 36, which has tee hooks 38, 40 and 42 extending rearwardly therefrom. The tee hooks are spaced, sized, and configured so that, when the face 36 lies against the front of flange 12 of the post 10, the tee hooks extend through the adjacent slots. For example, tee hooks 38, 40 and 42 extend into and through the slots 18, 20 and 22 in FIG. 2.

As seen in FIGS. 1, 2 and 3, the slots under the tee hooks, which separate the shanks of tee hooks from the face 36, are not of uniform thickness but they are more narrow toward the shank of the tee. The narrowest part of the slot under the tee is approximately the thickness of the flange 12. The larger openings at the ends of the tee, away from the shank of the tee, permit ease of engagement. As seen in FIGS. 2 and 3, only one side of the tee hook is used as engagement by sliding down into the slot. The utilization of the other side of the tee will be described below.

The back of the web 34 is spaced from the face 36 at least as much as the thickness of the panel 26, or slightly more for convenient installation. The web 34 extends to the side and provides structure by which the identification plate 44 can be attached. In the specific illustration, which is a preferred embodiment, the identification plate is a sheet of polymer material. It may be colored, it may be translucent or transparent. It is suitable for engraving therein or attaching thereto such identification data as the name of the occupant of the open office, the room number or other space identification in the open office, the department to which the open office function is attached, or a description of the function performed in this particular open office.

The identification plate 44 is shown as elliptical. It has a screw opening 46 therethrough. Screw 48 has a head which engages on the front face of the identification plate. The screw extends through the screw opening 46 and engages in a threaded screw hole 50 in the web 34. A recess 52 is provided on the front of the web. This recess is substantially the thickness of the identification plate 44 and is of the same configuration so that the end of the identification plate can lie in the recess. This position is seen in FIGS. 1, 3, 4, 5, 6, and 7. The recess 52 and identification plate 44 are configured so that they inter-engage, as by non-circular edges, to prevent the identification plate from rotating around the screw 48, thus providing a fixed position for it. It is seen that the mounting bracket 30 can have its flange 32 inserted into the space 29 and engaged in slots in the post. The mounting bracket is thus securely retained in place, but can be removed should the need occur.

Figure 4:
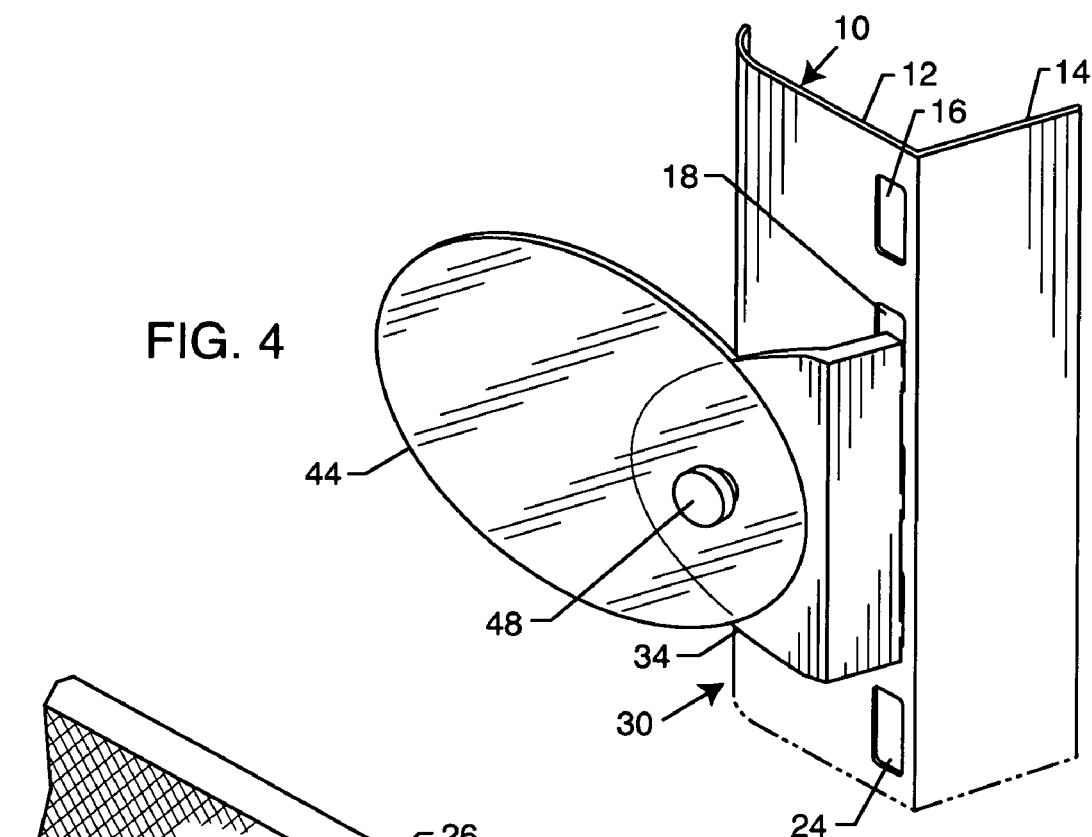
FIG. 4 is a similar view showing the reversible mounting bracket engaged in the upright post.
Figure 6:
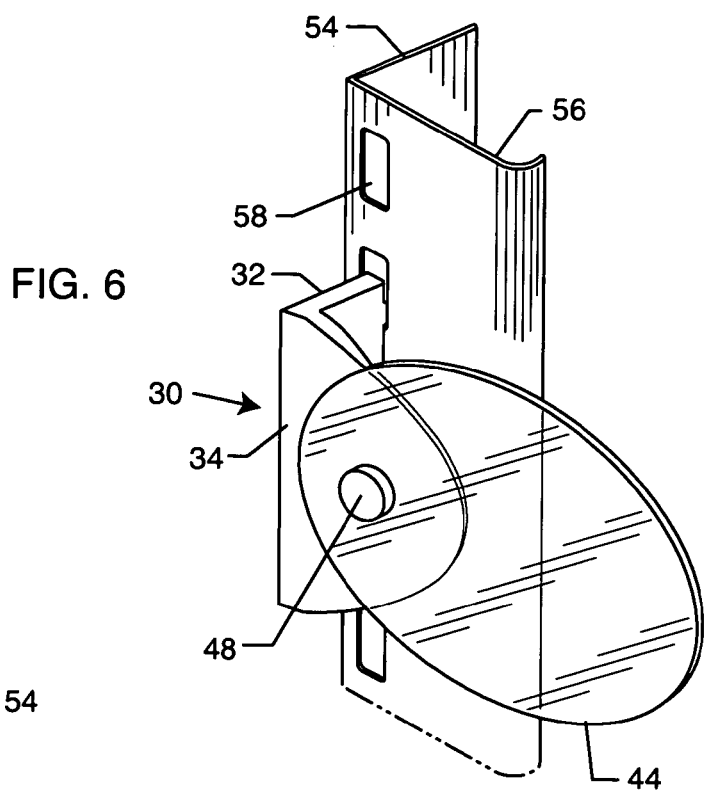
FIG. 6 is similar to FIG. 4 but showing the reversible mounting bracket mounted on the post in opposite orientation.
Figure 7:
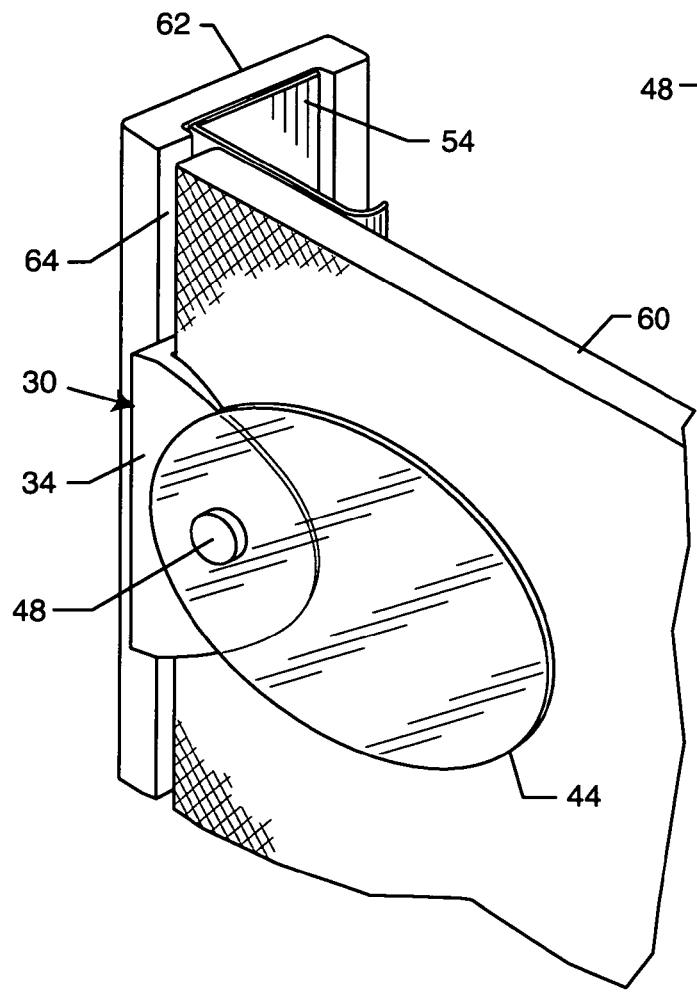
FIG. 7 is similar to FIG. 5 but showing the reversible mounting bracket mounted on the post in opposite orientation.

FIGS. 6 and 7 show a post 54 which is identical to the post 10, except that flange 56 with the series of slots 58 is pointed to the right, rather than to the left, as seen in FIG. 4. The same post may be used, but it is installed the other way to define the entryway opening to the left of the post, rather than to the right of the post as in FIG. 5. Panel 60 and trim strip 62 are attached to the post 54 to define a personnel opening to the left of the post. Again, a space 64 is present. In this kind of arrangement in the open office system, the mounting bracket is installed with its flange 32 entering into the space 64 and its tee hooks 38, 40 and 42 engaging in appropriate slots in the series of slots 58. In this utilization, the other side of the tee hook is engaged so that the mounting bracket and its identification plate are also securely held in position in this orientation. The mounting bracket can be easily detached for reuse. It may be detached for reinstallation of the new identification plate and reinstalled in the same location.

This invention has been described in its presently contemplated best mode and it is clear that it is susceptible to numerous modifications, modes, and embodiments within the ability of those skilled in the art and without the exercise of the inventive faculty. Accordingly, the scope of this invention is defined by the scope of the following claims.

The invention claimed is:

1. A reversible mounting bracket comprising:
a flange on said mounting bracket, said flange having a first end and a second end, a plurality of engagement structures on said flange, said engagement structures being tee-shaped so that said tee-shaped engagement structures can engage into a plurality of slots in an upright post wherein the slots are vertically in line, said post being configured to receive a panel, said flange being sufficiently long to engage in said slots and position said web outside of the panel, said engagement structures being configured to engage in the slots in the post when said first end of said flange is directed upwardly or downwardly with respect to the upright post;

a web mounted on said flange, said web being configured for carrying identification thereon, a separate identification plate releasably secured to said web so that different sizes, shapes, attachment methods and colors of identification plates and identifiers thereon can be selectively attached to said web;

said identification plate having an opening therethrough and a removable securing device which engages in said opening and engages in said web to releaseably attach said identification plate to said web.

2. A reversible mounting bracket comprising:
a flange on said mounting bracket, said flange having a first end and a second end, a plurality of engagement structures on said flange, said engagement structure structures being tee-shaped so that said tee-shaped engagement structures can engage into a plurality of slots in an upright post wherein the slots are vertically in line, said post being configured to receive a panel, said flange being sufficiently long to engage in said slots and position said web outside of the panel, said engagement structures being configured to engage in the slots in the post when said first end of said flange is directed upwardly or downwardly with respect to the upright post;

a web mounted on said flange, said web being configured for carrying identification thereon, a separate identification plate releasably secured to said web so that different sizes, shapes, attachment methods and colors of identification plates and identifiers thereon can be selectively attached to said web;

a recess in said web configured to receive a portion of said identification plate so as to aid in securely positioning said identification plate on said web, said identification plate having an opening therethrough and a removable securing device which engages in said opening and engages in said web to releaseably attach said identification plate to said web.

3. Reversible mounting bracket for open office identification, comprising:
a flange having attachment structure thereon, said flange being sized to be positioned between a panel and a trim strip mounted on an upright post of an open office structure wherein the open upright post has a plurality of vertically aligned slots therein in which the open office panel is engaged, said flange having structure thereon for releasably engaging with the slots in the upright post, said flange being of sufficient length so that it can reach the slots in the upright post when the panel is attached to the upright post by reaching past the panel so that said engagement structure on said flange can engage in the slots in the upright post, said flange having a first end and a second end, said engagement structure being configured so that said engagement structure engages with the slots in the upright post when said first end is positioned in an upward direction and said second end is positioned in an upward direction; and attachment structure on said flange for the attachment of identification thereon.

4. The reversible mounting bracket of claim 3 wherein said attachment structure for identification includes a web which is unitarily formed with said flange and there is mounting structure on said web for the placement of an identification plate thereon.

5. The reversible mounting bracket of claim 4 wherein an identification plate is releaseably attached to said web.

6. The reversible mounting bracket of claim 5 wherein said web has a recess therein configured to receive at least a portion of said identification plate to aid in securely retaining said identification plate with respect to said web.

7. The reversible mounting bracket of claim 6 wherein said identification plate has an edge and said recess is configured to engage said edge of said identification plate to aid in securely retaining said identification plate with respect to said web.

8. The reversible mounting bracket of claim 6 wherein a screw engages through said identification plate and engages in said web to releasably retain said identification plate on said web.

9. The reversible mounting bracket of claim 3 wherein said engagement structure and said flange comprises a plurality of tee-shaped hooks, said hooks being configured as a tee on a shank so that a plurality of said hooks engage through the aligned openings in the post and engage the post.

10. The reversible mounting bracket of claim 9 wherein said tee-shaped posts are tapered on each side of the shank of said tee to aid in engagement and provide secure hooking.

11. The reversible mounting bracket of claim 10 wherein said tee hooks are substantially rectangular in configuration so that they can enter substantially rectangular openings in the upright post.

* * * * *